US012665701B2

(12) United States Patent
Marcone et al.

(10) Patent No.: US 12,665,701 B2
(45) Date of Patent: Jun. 23, 2026

(54) INDICATION OF PUCCH REPETITIONS VIA DCI CRC SCRAMBLING FOR WIRELESS NETWORKS

(71) Applicant: Nokia Technologies Oy, Espoo (FI)

(72) Inventors: Alessio Marcone, Munich (DE); Frank Frederiksen, Aalborg (DK); Arman Ahmadzadeh, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 352 days.

(21) Appl. No.: 18/474,319

(22) Filed: Sep. 26, 2023

(65) Prior Publication Data

US 2024/0114557 A1    Apr. 4, 2024

Related U.S. Application Data

(60) Provisional application No. 63/377,984, filed on Sep. 30, 2022.

(51) Int. Cl.
*H04L 1/00*          (2006.01)
*H04L 1/08*          (2006.01)
(Continued)

(52) U.S. Cl.
CPC .......... *H04L 1/0072* (2013.01); *H04L 1/0061* (2013.01); *H04L 1/08* (2013.01); *H04W 74/004* (2013.01); *H04W 74/0833* (2013.01)

(58) Field of Classification Search
CPC ........... H04W 74/0833; H04W 74/004; H04W 72/21; H04W 72/232; H04L 1/0061; H04L 1/08; H04L 1/1858; H04L 1/0072
See application file for complete search history.

(56) References Cited

U.S. PATENT DOCUMENTS

2019/0313342 A1*   10/2019   Papasakellariou .. H04W 52/325
2020/0221448 A1     7/2020   Park
(Continued)

FOREIGN PATENT DOCUMENTS

WO        2021/227037 A1    11/2021

OTHER PUBLICATIONS

Office action received for corresponding European Patent Application No. 23198421.2, dated Sep. 23, 2025, 6 pages.
"3rd Generation Partnership Project; Technical Specification Group Radio Access Network; NR; Physical layer procedures for control (Release 17)", 3GPP TS 38.213, V17.2.0, Jun. 2022, pp. 1-256.
(Continued)

*Primary Examiner* — Redentor Pasia
(74) *Attorney, Agent, or Firm* — Carter, DeLuca & Farrell LLP

(57)              ABSTRACT

According to example embodiment, a method may include receiving, by a user device from a network node, a message including a first set of bits of a cyclic redundancy check that is scrambled based on a sequence of bits, wherein the sequence of bits indicates or is associated with a number of physical uplink control channel (PUCCH) transmissions within a random access procedure; descrambling, by the user device, the cyclic redundancy check to obtain the sequence of bits; determining, by the user device based on the sequence of bits, the number of physical uplink control channel transmissions within the random access procedure; and performing, by the user device within the random access procedure, a transmission of a physical uplink control channel the determined number of times.

12 Claims, 8 Drawing Sheets

(51) Int. Cl.
   *H04W 74/00*       (2009.01)
   *H04W 74/0833*     (2024.01)

(56)              References Cited

U.S. PATENT DOCUMENTS

| | | | | |
|---|---|---|---|---|
| 2021/0250932 A1* | 8/2021 | Liu | .................... | H04W 52/14 |
| 2022/0053566 A1* | 2/2022 | Taherzadeh Boroujeni | ............... | |
| | | | | H04W 74/002 |
| 2022/0322417 A1* | 10/2022 | Taherzadeh Boroujeni | ............... | |
| | | | | H04W 74/006 |
| 2023/0247680 A1* | 8/2023 | Seok | .................... | H04L 1/1854 |
| 2023/0388061 A1* | 11/2023 | Shen | .................... | H04L 5/0055 |
| 2024/0114522 A1* | 4/2024 | Cozzo | ................... | H04L 1/1854 |
| 2024/0389097 A1* | 11/2024 | Yang | ................... | H04L 27/2601 |
| 2024/0405951 A1* | 12/2024 | Ying | ................... | H04L 5/0055 |
| 2025/0016768 A1* | 1/2025 | Zhao | ................ | H04W 72/1268 |
| 2025/0024548 A1* | 1/2025 | Zhao | ........................ | H04L 1/08 |
| 2025/0056594 A1* | 2/2025 | Kim | .................... | H04L 1/1861 |
| 2025/0133601 A1* | 4/2025 | Zhao | ................... | H04W 72/232 |

OTHER PUBLICATIONS

"Revised WID: NR NTN (Non-Terrestrial Networks) enhancements", 3GPP TSG RAN Meeting #97-e, RP-222654, Agenda: 9.3.2.7, Thales, Sep. 12-16, 2022, 8 pages.

"3rd Generation Partnership Project; Technical Specification Group Radio Access Network; NR; Multiplexing and channel coding (Release 17)", 3GPP TS 38.212, V17.2.0, Jun. 2022, pp. 1-201.

"Discussion on UE features for NR coverage enhancement", 3GPP TSG RAN WG1 #107bis-e, R1-2200393, Agenda: 8.15.8, Intel Corporation, Jan. 17-25, 2022, pp. 1-10.

"Introduction of coverage enhancements in NR", 3GPP TSG RAN WG1 #107-e, R1-2112928, Samsung, Nov. 11-19, 2021, pp. 1-13.

Extended European Search Report received for corresponding European Patent Application No. 23198421.2, dated Feb. 22, 2024, 10 pages.

"Physical Downlink Control Channels", 3GPP TSG RAN WG1 #82 Bis, R1-155705, Agenda: 7.2.1.2, Qualcomm Incorporated, Oct. 5-9, 2015, pp. 1-9.

* cited by examiner

Example Wireless Network 130

**Example 4-Step Random
Access Procedure**

Example 2-Step Random Access Procedure

UE gNB (or network node)

Message A (MsgA)

A — Random Access Preamble+ transmission (msg1+msg3) →

Message B (MsgB)

B ← Random Access Response + Contention Resolution (msg2+msg4)

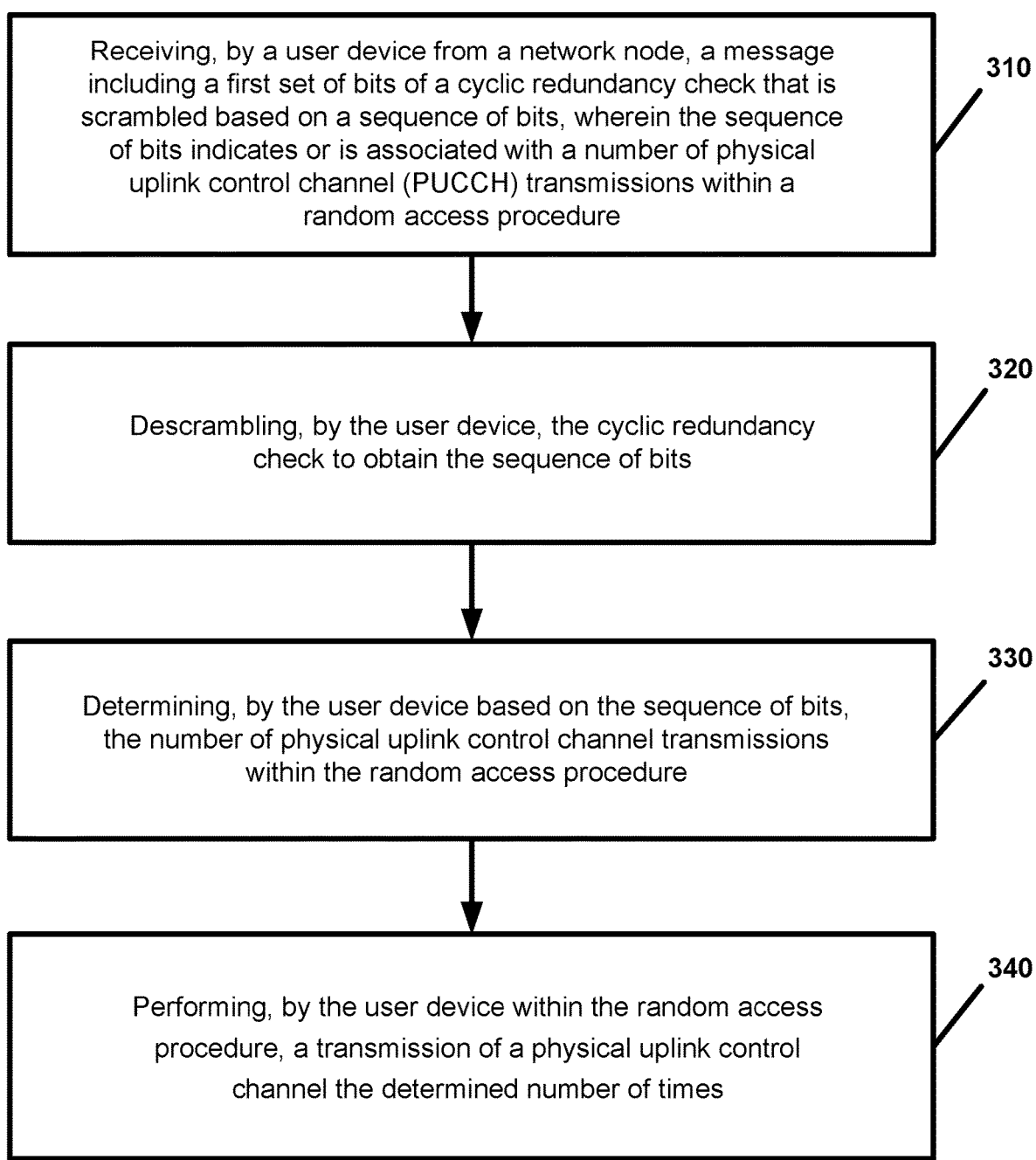

Receiving, by a user device from a network node, a message including a first set of bits of a cyclic redundancy check that is scrambled based on a sequence of bits, wherein the sequence of bits indicates or is associated with a number of physical uplink control channel (PUCCH) transmissions within a random access procedure — 310

Descrambling, by the user device, the cyclic redundancy check to obtain the sequence of bits — 320

Determining, by the user device based on the sequence of bits, the number of physical uplink control channel transmissions within the random access procedure — 330

Performing, by the user device within the random access procedure, a transmission of a physical uplink control channel the determined number of times — 340

FIG. 3

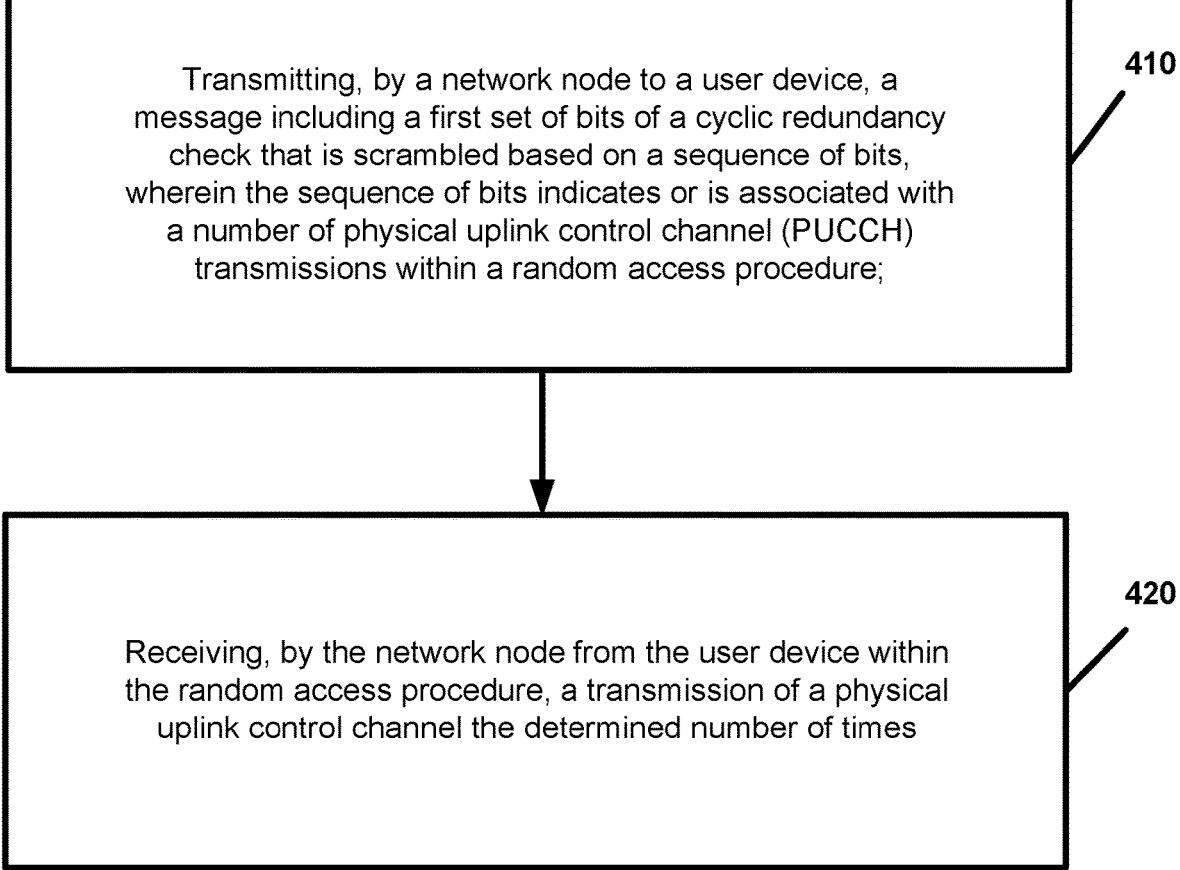

Transmitting, by a network node to a user device, a message including a first set of bits of a cyclic redundancy check that is scrambled based on a sequence of bits, wherein the sequence of bits indicates or is associated with a number of physical uplink control channel (PUCCH) transmissions within a random access procedure;

410

Receiving, by the network node from the user device within the random access procedure, a transmission of a physical uplink control channel the determined number of times

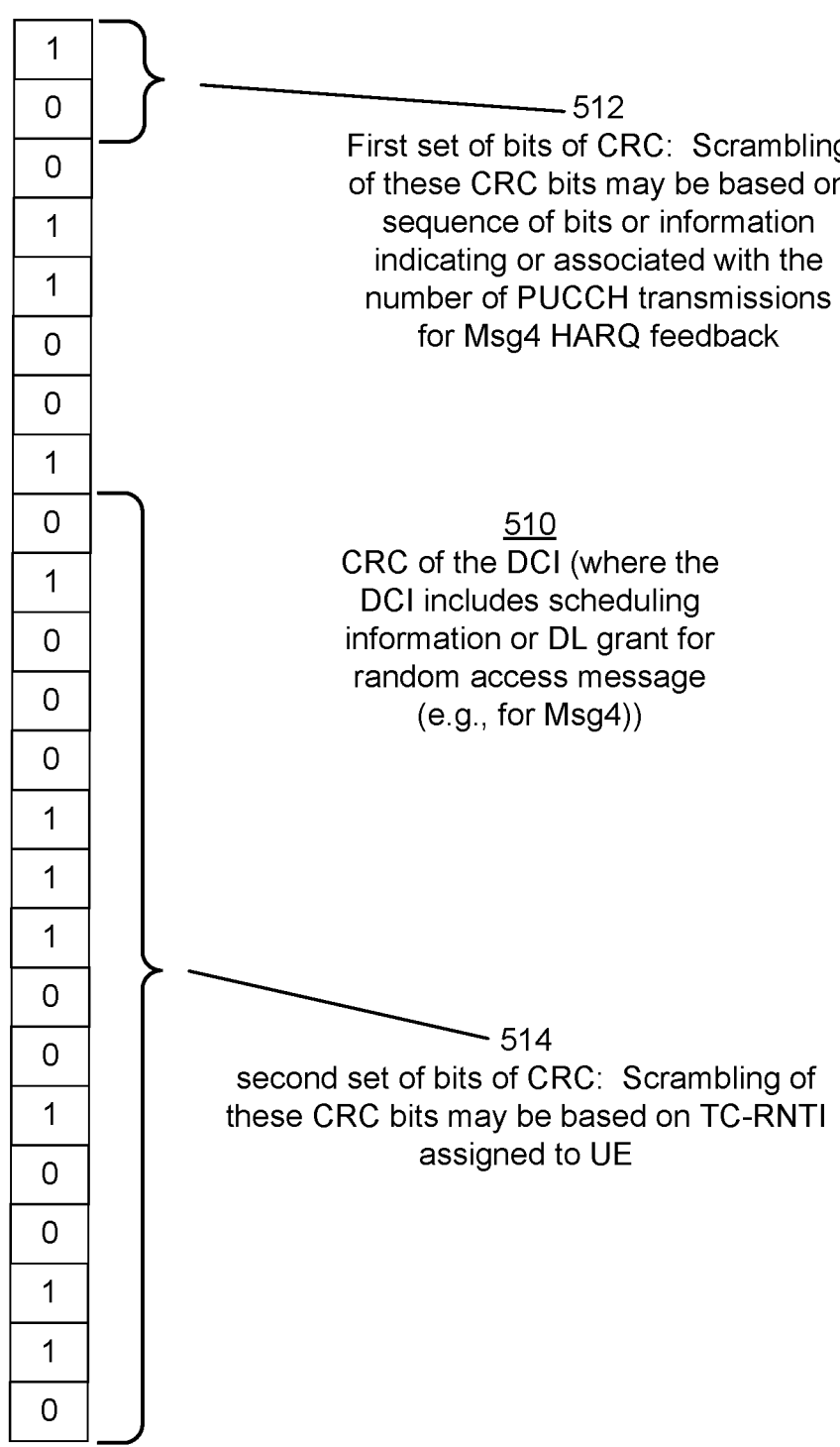

512
First set of bits of CRC: Scrambling of these CRC bits may be based on sequence of bits or information indicating or associated with the number of PUCCH transmissions for Msg4 HARQ feedback 510
CRC of the DCI (where the DCI includes scheduling information or DL grant for random access message (e.g., for Msg4))

514
second set of bits of CRC: Scrambling of these CRC bits may be based on TC-RNTI assigned to UE

FIG. 5

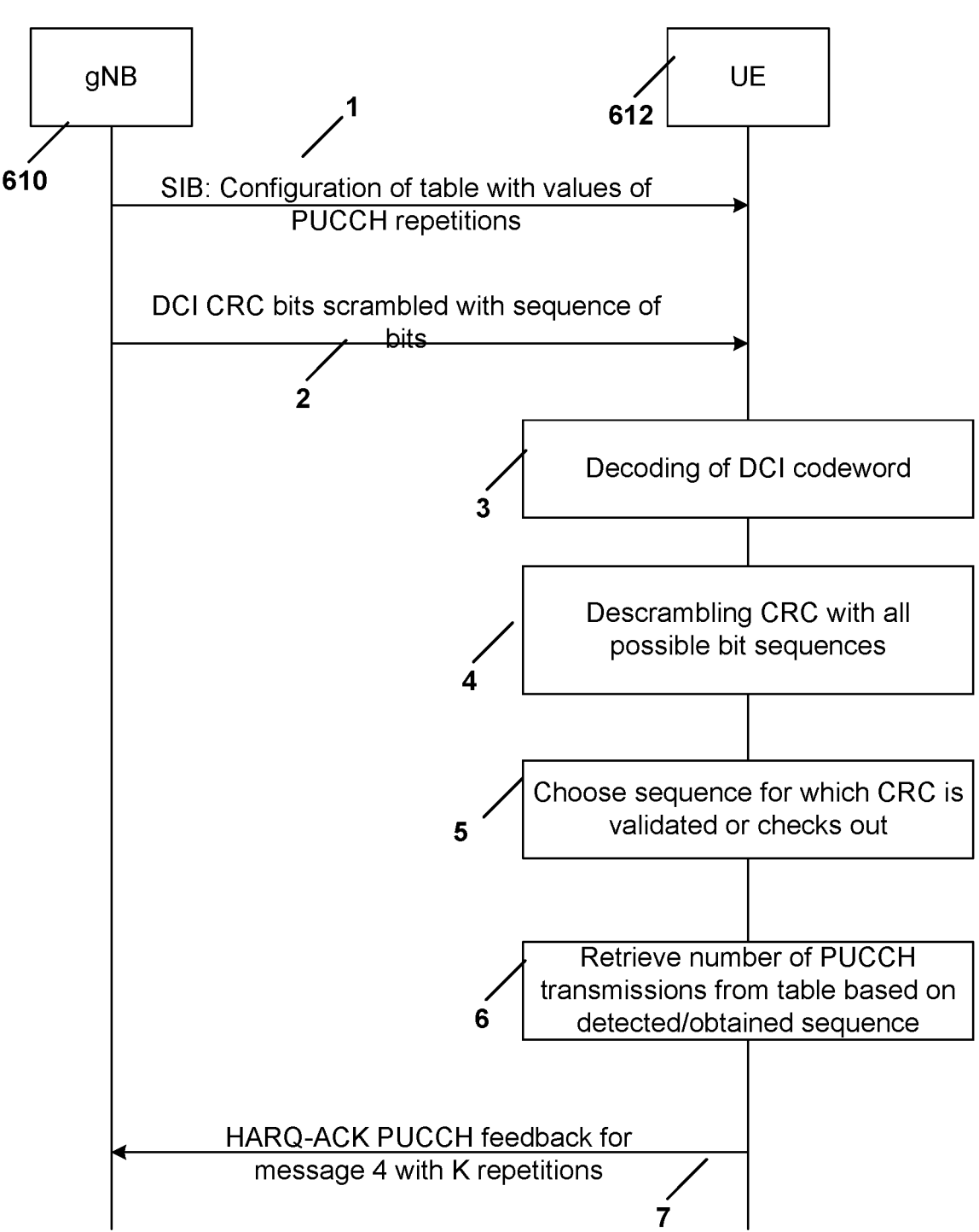

610 gNB

612

UE

1

SIB: Configuration of table with values of PUCCH repetitions

DCI CRC bits scrambled with sequence of bits

2

3
Decoding of DCI codeword

4
Descrambling CRC with all possible bit sequences

5
Choose sequence for which CRC is validated or checks out

6
Retrieve number of PUCCH transmissions from table based on detected/obtained sequence HARQ-ACK PUCCH feedback for message 4 with K repetitions

INDICATION OF PUCCH REPETITIONS VIA DCI CRC SCRAMBLING FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user device from a network node, a message including a first set of bits of a cyclic redundancy check that is scrambled based on a sequence of bits, wherein the sequence of bits indicates or is associated with a number of physical uplink control channel (PUCCH) transmissions within a random access procedure; descrambling, by the user device, the cyclic redundancy check to obtain the sequence of bits; determining, by the user device based on the sequence of bits, the number of physical uplink control channel transmissions within the random access procedure; and performing, by the user device within the random access procedure, a transmission of a physical uplink control channel the determined number of times.

According to an example embodiment, a method may include transmitting, by a network node to a user device, a message including a first set of bits of a cyclic redundancy check that is scrambled based on a sequence of bits, wherein the sequence of bits indicates or is associated with a number of physical uplink control channel (PUCCH) transmissions within a random access procedure; and receiving, by the network node from the user device within the random access procedure, a transmission of a physical uplink control channel the determined number of times.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 3 is a flow chart illustrating operation of a user device (or UE) according to an example embodiment.

FIG. 4 is a flow chart illustrating operation of a network node according to an example embodiment.

FIG. 5 is a diagram illustrating sets of bits of a cyclic redundancy check (CRC) of a DCI that are scrambled according to an example embodiment.

FIG. 6 is a diagram illustrating operation of a network according to an example embodiment.

DETAILED DESCRIPTION

Figure 1:
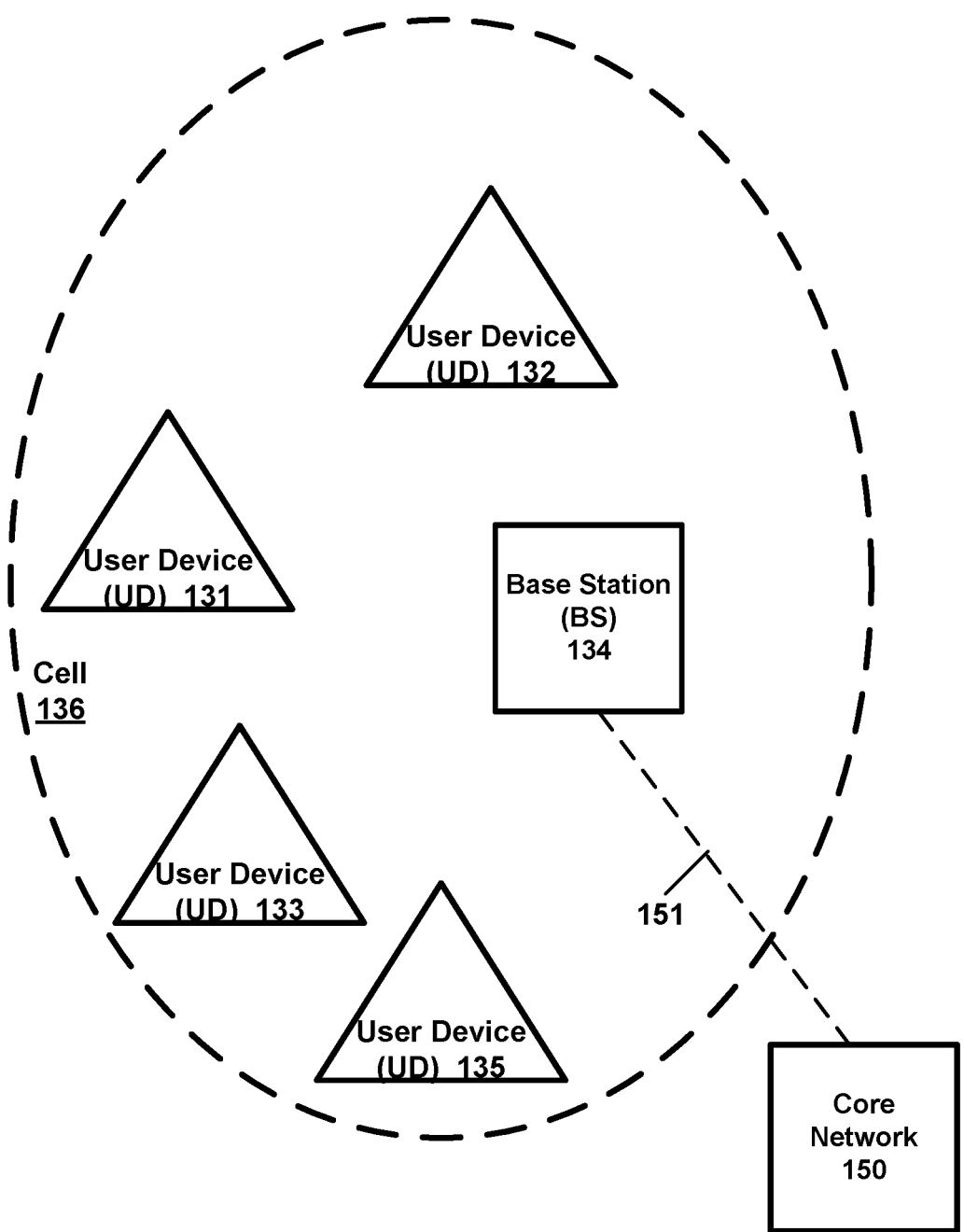
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNB s) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

At least in some example cases, a UE may be in one of multiple states (e.g., such as one of three Radio Resource Control (RRC) states) with respect to a network node or gNB. In an Idle state (RRC Idle), there is typically no (or limited) RRC context (where a RRC context may include information or parameters necessary for communication between the UE and gNB/network node) stored in the RAN (radio access network) node (e.g., gNB) or network node, or UE, and the UE does not belong (or is not connected to) to a specific cell. From a core network perspective, the Idle UE is in an Idle (CM_Idle) state. No data transfer may typically occur between a UE and network node (e.g., gNB) when the UE is in an Idle state, as the UE sleeps (in a low power state) most of the time to conserve power. In an Idle state, a UE may typically periodically wake up to receive paging messages from the network.

A UE may transition from Idle state (e.g., RRC Idle) to a Connected state (e.g., RRC Connected state, where the UE is connected to the network node) by performing a random access (RACH) procedure with the gNB or network node. As part of the RACH procedure, both the UE and network node (e.g., gNB) may obtain the context, e.g., communication parameters necessary to allow UE-gNB communication. As an example communication parameter, the UE may obtain, e.g., as part of a RACH procedure with gNB or network node, a timing advance to allow the UE to perform uplink transmission to the gNB. The UE may also obtain a UE identity from the network, e.g., such as a cell-radio network temporary identifier (C-RNTI), which may be used by the UE for communication or signalling with the network or gNB. In a connected state (e.g., RRC Connected) with respect to a cell (or gNB or DU), the UE is connected to a gNB or network node, and the UE may receive data, and may send data (e.g., based on receiving an uplink grant).

Figure 2A:
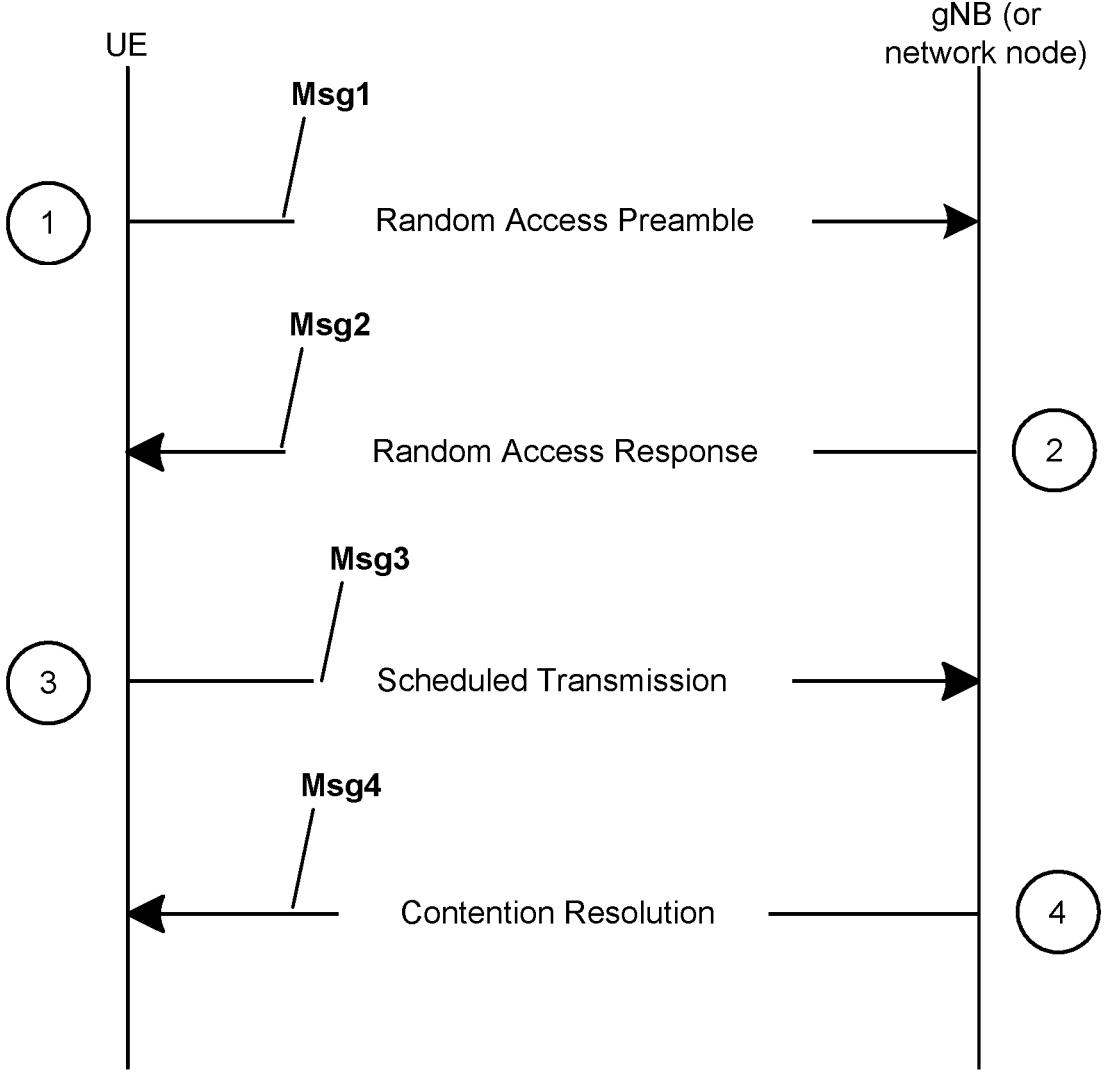
FIG. 2A is a diagram illustrating operations of a 4-step random access (RACH) procedure according to an example embodiment.

FIG. 2A is a diagram illustrating operations of a 4-step random access (RACH) procedure according to an example embodiment. When the RACH procedure is triggered (caused to be performed by the UE), the UE sends a random access (RACH) preamble over the random access (RACH) channel (Step 1), or Msg1 (message 1). There are different groups of preambles defined or configured, depending on the size of Msg3 (message 3) and based on the UE's channel conditions. The UE obtains information on how to access the RACH channel from system information block 1 (SIB1) broadcasted in the system information (SI) from the gNB. After receiving message 1 (random access preamble from the UE), the gNB determines the receive timing of the received random access preamble. Based on the receive timing of the received preamble (if there are no collisions with other UEs), the gNB determines a timing advance (or TA or timing advance command) to adjust the timing of the UE uplink frame to align with a downlink frame (and also to align uplink receive timing with other UE uplink frames). Because each UE may be provided at a different location, each UE may have a different radio propagation delay, and thus a different or specific timing advance with respect to a gNB.

As shown in FIG. 2A, at Step 2 (Msg2 or message 2), the gNB responds to the UE with a random access response (RAR), which may include an index to (or identifier of) the received random access (or RACH) preamble (also known as RAPID or random access preamble identifier), the timing advance (TA, or timing advance command), a temporary cell-radio network temporary identifier (TC-RNTI) assigned to the UE, and an uplink (UL) grant (e.g., including scheduling information and/or information indicating resources to be used for UL transmission) to be used by the UE for uplink transmission of message 3 (Msg3). Upon receiving the RAR message (Msg2), the UE can send the first uplink transmission to the network (Msg3 or message 3). The size of the transmission of Msg3 depends on the grant received at step 2 (Msg2 or message 2). Step 4 (Msg 4 or message 4) may include transmission of a DL message from gNB to UE that involves the contention resolution phase.

Figure 2B:
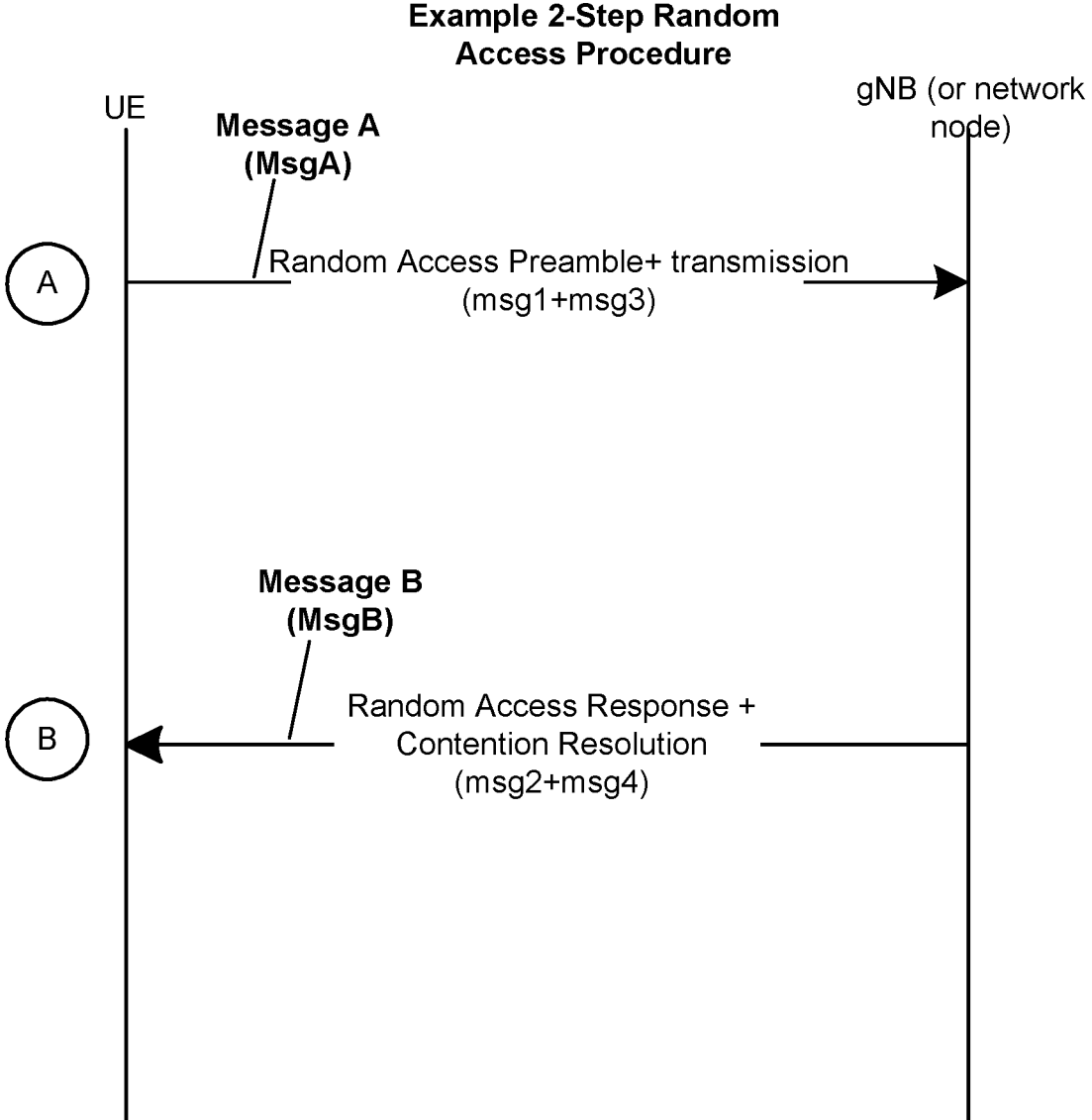
FIG. 2B is a diagram illustrating operations of a 2-step random access (RACH) procedure according to an example embodiment.

Furthermore, as an alternative RACH procedure, a 2-step RACH (random access) procedure may be used to provide a faster random access procedure. FIG. 2B is a diagram illustrating operations of a 2-step random access (RACH) procedure according to an example embodiment. At message A (MsgA), a UE may transmit a message that includes contents of both Msg1 and Msg3 as a first message (MsgA) of the 2-step RACH procedure. And, for example, the network node or gNB may transmit Msg2 and Msg4 as a second message (or MsgB or message B) of the 2-step RACH procedure.

The Physical Uplink Control Channel (PUCCH) is the channel used in the Uplink (UL) by a UE for conveying control information through the Uplink Control Information (UCI). PUCCH time-frequency resources are RRC configured per UE, and different resources can be configured for different number of bits in the UCI. For example, for UCI with payload smaller than 2 bits, up to 32 PUCCH resources can be configured, whereas for UCI with payload larger than 2 bits, up to 8 PUCCH resources can be configured.

PUCCH resources can be used for reporting different UCI types, including HARQ-ACK, Scheduling Request (SR) and Channel State Information (CSI), in a periodic, semi-persistent or dynamic manner. For example, the HARQ-ACK feedback for a scheduled PDSCH is conveyed through a PUCCH resource indicated by the PUCCH Resource Indicator (PRI) field in the scheduling DCI. Conversely, periodic CSI is conveyed by a periodic PUCCH resource RRC configured.

In initial access (e.g., during a random access procedure), and for transmission of the HARQ-ACK feedback for the Msg4 (message 4), RRC configuration of PUCCH resources has not occurred yet. For this reason, 3GPP TS 38.213 defines a table of PUCCH resource sets before a dedicated PUCCH resource configuration occurs, with 16 different PUCCH resources. This table however does not contain information of the number of PUCCH repetitions for each resource, since PUCCH repetitions for PUCCH transmissions before RRC configuration are currently not supported.

TC-RNTI (temporary cell-radio network temporary identifier) may be used in initial access (random access procedure) for addressing specific UEs that do not have a C-RNTI associated yet. For example, the TC-RNTI may be a number ranging from 1 to 65519, and may be, for example, represented by a string of 16 bits. TC-RNTI is assigned to a UE by MAC information included in a RAR (random access response) message transported in Msg2 of the random access procedure. After the UE receives the TC-RNTI via the RAR within Msg2, the TC-RNTI may be used by the UE to both scramble the payload of the Msg3 and as an identifier scrambling the CRC of the DCI scheduling the Msg4. Thus, TC-RNTI is used by UE for scrambling codeword for Msg3 in UL; and gNB uses the TC-RNTI for scrambling part of (or some of the bits of) CRC (cyclic redundancy check) for Msg4; UE calculates CRC on all the candidates in CORE-SET (control resource set), so the UE tests various locations to find its identity (its TC-RNTI), if it is present in the CRC (e.g., if the TC-RNTI was used to scramble the portion or some bits of the CRC).

In addition, with respect to the random access procedure, e.g., shown in FIG. 2A, the gNB may provide or transmit downlink control information (DCI) within a physical downlink control channel (PDCCH) that includes a DL grant (e.g., indicating time-frequency resources) for the DL transmission of Msg2 (message 2). Also, the gNB may provide or transmit downlink control information (DCI) that includes an DL grant (e.g., indicating resources) for the DL transmission of Msg4 (message 4). Also, the UE may transmit a PUCCH (physical uplink control channel) including a hybrid-automatic repeat request (HARQ) feedback, e.g., which may include a HARQ ACK (acknowledgement) that acknowledges receipt of Msg4 (message 4), or a HARQ NACK (negative acknowledgement) that indicates that the UE did not receive Msg 4 (or message 4) of the random access procedure. If the gNB does not receive the HARQ ACK for Msg4, the gNB will retransmit Msg4.

In some cases, the gNB may configure the UE to transmit information multiple times (repetitions), e.g., in order to increase the received energy of such information at the receiving gNB, where the gNB may combine the multiple transmissions or repetitions of the same information, if received at the gNB (e.g., in order to increase the likelihood of successfully receiving and decoding such information at the gNB). However, presently, the gNB does not provide for or indicate a number of PUCCH repetitions (number of PUCCH transmissions) for transmission by the UE of HARQ feedback (e.g., HARQ ACK and/or NACK feedback) for message 4 of the random access procedure, since the gNB presently configures PUCCH repetitions (or a number of PUCCH transmission) via RRC (radio resource control) message only after a random access procedure has been completed successfully.

However, in some cases, the transmission of PUCCH (including HARQ feedback or HARQ ACK) for message 4 (Msg4) may be considered a limiting factor for cell range. Therefore, according to an example embodiment, and as described below, a mechanism or one or more techniques are described to allow gNB to configure the UE for a number of PUCCH repetitions or PUCCH transmissions for message 4 (Msg4) (e.g., configure UE for a number of PUCCH transmissions for transmission of HARQ feedback for Msg4 (message 4) of the random access procedure), e.g., to increase range, coverage and/or reliability.

Therefore, according to an example embodiment(s), techniques or embodiments are provided for gNB to indicate to the UE a number of PUCCH repetitions (or PUCCH transmissions) for the PUCCH carrying the HARQ feedback (e.g., HARQ ACK) of the Msg4 of a random access procedure, based on a scrambling of a portion (at least some of the bits) of the CRC (cyclic redundancy check) of the DCI scheduling the Msg4.

FIG. 3 is a flow chart illustrating operation of a user device (or UE) according to an example embodiment. Operation 310 includes receiving, by a user device from a network node, a message including a first set of bits of a cyclic redundancy check that is scrambled based on a sequence of bits, wherein the sequence of bits indicates or is associated with a number of physical uplink control channel (PUCCH) transmissions within a random access procedure. Operation 320 includes descrambling, by the user device, the cyclic redundancy check to obtain the sequence of bits. Operation 330 includes determining, by the user device based on the sequence of bits, the number of physical uplink control channel transmissions within the random access procedure. And, operation 340 includes performing, by the user device within the random access procedure, a transmission of a physical uplink control channel the determined number of times.

With respect to the method of FIG. 3, the receiving may include receiving, by the user device from the network node, the message including downlink control information (DCI), the downlink control information including at least the first set of bits of the cyclic redundancy check that is scrambled based on the sequence of bits, wherein the sequence of bits indicates or is associated with the number of physical uplink control channel (PUCCH) transmissions within the random access procedure.

With respect to the method of FIG. 3, the downlink control information (DCI) may include a downlink grant or scheduling information for a message 4 of the random access procedure.

With respect to the method of FIG. 3, the method may include determining, by the user device, a mapping of different values of the sequence of bits to different numbers of physical uplink control channel (PUCCH) transmissions within the random access procedure.

With respect to the method of FIG. 3, the determining the number of physical uplink control channel (PUCCH) transmissions may be based on a mapping of the sequence of bits to a number of physical uplink control channel (PUCCH) transmissions within a random access procedure.

With respect to the method of FIG. 3, the determining the number of PUCCH transmissions may be based on at least one of the following: determining a decimal representation of the sequence of bits, wherein the decimal representation of the sequence of bits indicates the number of physical uplink control channel (PUCCH) transmissions within the random access procedure; or performing a lookup into a table of numbers of physical uplink control channel (PUCCH) transmission based on the sequence of bits to obtain the number of physical uplink control channel transmissions.

With respect to the method of FIG. 3, the performing may include: performing, by the user device within a random access procedure, the transmission of the physical uplink control channel including hybrid automatic repeat request (HARQ) feedback for a message 4 of the random access procedure, the determined number of times.

With respect to the method of FIG. 3, the determining the mapping of different values of the sequence of bits to different number of the physical uplink control channel (PUCCH) transmissions may include performing at least one of the following: determining, by the user device as a known or a predetermined mapping, the mapping of different values of the sequence of bits to different number of the physical uplink control channel (PUCCH) transmissions; or determining, by the user device based on a transmission or indication by the network node, the mapping of different values of the sequence of bits to different number of the physical uplink control channel (PUCCH) transmissions.

With respect to the method of FIG. 3, the transmission or indication by the network node may be included in either a system information block or in a message of the random access procedure.

With respect to the method of FIG. 3, the first set of bits of the cyclic redundancy check may be scrambled based on the sequence of bits that indicates or is associated with the number of physical uplink control channel transmissions within the random access procedure; and a second set of bits of the cyclic redundancy check may be scrambled based on a temporary cell-radio network temporary identifier (TC-RNTI) assigned to the user device, wherein the second set of bits is different than the first set of bits.

With respect to the method of FIG. 3, a location and/or a number of bits of the first set of bits of the cyclic redundancy check that is scrambled based on the sequence of bits, may be determined based on at least one of the following: the location and/or number of bits of the first set of bits of the cyclic redundancy check is known or determined by the user device, and/or is based on a standard or specification; the location and/or number of bits of the first set of bits of the cyclic redundancy check is determined by the user device based on system information broadcast by the network node; or the location and/or number of bits of the first set of bits of the cyclic redundancy check is determined by the user device based on information previously received by the user device from the network node as part of the random access procedure.

With respect to the method of FIG. 3, there may be a mapping between one or more temporary cell-radio network temporary identifiers (TC-RNTIs) and one or more numbers of transmissions of the physical uplink control channel.

With respect to the method of FIG. 3, the method may further include determining, by the user device, the number of transmissions of the physical uplink control channel based on a temporary cell-radio network temporary identifiers (TC-RNTI) assigned to the user device via a message 2 of the random access procedure.

With respect to the method of FIG. 3, there may be a mapping between one or more temporary cell-radio network temporary identifiers (TC-RNTIs) and one or more numbers of transmissions of the physical uplink control channel, wherein a first temporary cell-radio network temporary identifier (TC-RNTI) assigned to the user device that is an offset of M from a second temporary cell-radio network temporary identifier (TC-RNTI) indicates a number of M transmissions of the physical uplink control channel.

FIG. 4 is a flow chart illustrating operation of a network node according to an example embodiment. Operation 410 includes transmitting, by a network node to a user device, a message including a first set of bits of a cyclic redundancy check that is scrambled based on a sequence of bits, wherein the sequence of bits indicates or is associated with a number of physical uplink control channel (PUCCH) transmissions within a random access procedure. And, operation 420 includes receiving, by the network node from the user device within the random access procedure, a transmission of a physical uplink control channel the determined number of times.

With respect to the method of FIG. 4, the transmitting may include: transmitting, by the network node to the user device, the message including downlink control information (DCI), the downlink control information including at least the first set of bits of the cyclic redundancy check that is scrambled based on the sequence of bits, wherein the sequence of bits indicates or is associated with the number of physical uplink control channel (PUCCH) transmissions within the random access procedure.

With respect to the method of FIG. 4, the downlink control information (DCI) may include a downlink grant or scheduling information for a message 4 of the random access procedure.

With respect to the method of FIG. 4, the receiving may include: receiving, by the network node from the user device within a random access procedure, the physical uplink control channel including hybrid automatic repeat request (HARQ) feedback for a message 4 of the random access procedure, the determined number of times.

With respect to the method of FIG. 4, the method may further include transmitting an indication of a mapping of different values of the sequence of bits to different number of the physical uplink control channel (PUCCH) transmissions.

With respect to the method of FIG. 4, the indication transmitted by the network node may be included in either a system information block or in a message of the random access procedure.

With respect to the method of FIG. 4, the first set of bits of the cyclic redundancy check may be scrambled based on the sequence of bits that indicates or is associated with the number of physical uplink control channel transmissions within the random access procedure; and a second set of bits of the cyclic redundancy check may be scrambled based on a temporary cell-radio network temporary identifier (TC-RNTI) assigned to the user device, wherein the second set of bits is different than the first set of bits.

With respect to the method of FIG. 4, there may be a mapping between one or more temporary cell-radio network temporary identifiers (TC-RNTIs) and one or more numbers of transmissions of the physical uplink control channel.

With respect to the method of FIG. 4, there may be a mapping between one or more temporary cell-radio network temporary identifiers (TC-RNTIs) and one or more numbers of transmissions of the physical uplink control channel, wherein a first temporary cell-radio network temporary identifier (TC-RNTI) assigned to the user device that is an offset of M from a second temporary cell-radio network temporary identifier (TC-RNTI) indicates a number of M transmissions of the physical uplink control channel.

Therefore, according to an example embodiment, a UE may receive a message, such as a DCI (downlink control information, on a physical downlink control channel (PDCCH)), which includes scheduling information or a downlink (DL) grant for a random access message, e.g., such as a message 4 (Msg4) of a random access procedure. The DCI may include a CRC (cyclic redundancy check), wherein a first set (or a first portion) of bits of the CRC is scrambled based on a sequence of bits, where the sequence of bits indicates or is associated with a number of PUCCH transmissions including HARQ feedback. The UE may descramble the CRC of the DCI to determine or obtain the sequence of bits. The sequence of bits may directly indicate the number of PUCCH transmissions for the HARQ feedback of message 4, e.g., the UE may determine a decimal representation of the sequence of bits, wherein the decimal representation of the sequence of bits indicates, is associated with or is related to the number of physical uplink control channel (PUCCH) transmissions within the random access procedure. For example, a three bit sequence may indicate up to 7 or 8 (depending on how this sequence is implemented or used) transmissions (repetitions) of the PUCCH.

For example, the decimal representation of the sequence of bits may indicate the number of PUCCH transmissions, e.g., a value of the sequence of bits of 001 (corresponding to a decimal value of one) may indicate one PUCCH transmissions that include HARQ feedback for Msg4; a value of the sequence of bits of 010 (corresponding to the decimal value two) may indicate two PUCCH transmissions that include HARQ feedback for the message 4, etc.

In another illustrative example, the number of PUCCH transmissions may be an offset (e.g., an offset of 1) greater than the decimal value of the sequence of bits. Thus, in this example, a value (of the sequence of bits) of 000 (corresponding to a decimal value zero) may indicate one PUCCH transmission (or repetition) that includes HARQ feedback for the message 4 of the random access procedure; a value of the sequence of bits of 001 may indicate two PUCCH transmissions that include HARQ feedback for Msg4; a value of 010 may indicate three PUCCH transmissions that include HARQ feedback for the message 4 of the random access procedure, etc. Thus, e.g., in both of these illustrative examples, the value of the sequence of bits indicates (or is associated with, or is related to) the number of PUCCH transmissions or repetitions, e.g., whether with an offset or without an offset, as examples. These are merely some examples, and other embodiments, techniques or mappings may be used to map or convert the different values of the sequence of bits to different numbers of PUCCH transmissions or repetitions.

In another embodiment, the UE may use the obtained sequence of bits to indirectly determine the number of PUCCH transmissions, e.g., by the UE performing a lookup into a table of numbers of physical uplink control channel (PUCCH) transmission based on the sequence of bits to obtain the number of physical uplink control channel transmissions or repetitions. For example, a sequence of bits having a value 010 may point to or indicate the third row of the lookup table, which may indicate (for example) that three PUCCH transmissions for (or which include) the message 4 HARQ feedback should be performed by the UE.

Thus, these examples illustrate different example techniques that may be used by a UE to determine the number of physical uplink control channel (PUCCH) transmissions within a random access procedure based on the obtained to determined sequence of bits, and other techniques may be used.

Also, for example, the mapping of one or more different values of the sequence of bits to different numbers of PUCCH transmissions that include the message 4 (or random access procedure message) HARQ feedback may be determined or known in advance by the UE (e.g., a required or known number of PUCCH transmissions for different values of the sequence of bits), or the UE may receive this mapping or indication of different values of the sequence of bits to different numbers of PUCCH transmissions via system information broadcast by the gNB. For example, the lookup table (or information indicating the lookup table) may be known in advance by the UE, or may be received by the UE via information transmitted (e.g., broadcast) by the gNB or network node.

Also, different bits of the CRC may be scrambled based on the sequence of bits and based on the TC-RNTI assigned to the UE. FIG. 5 is a diagram illustrating sets of bits of a cyclic redundancy check (CRC) of a DCI that are scrambled according to an example embodiment. In one embodiment, all bits of the CRC 510 may be scrambled based on one or both of the TC-RNTI and/or the sequence of bits indicating or associated with number of PUCCH transmissions that includes HARQ feedback for the random access message (e.g., message 4). In another embodiment, different subsets of bits of the CRC 510 may be scrambled based on the TC-RNTI and the sequence of bits. For example, as shown in FIG. 5, a first set of bits 512 may be scrambled based on the sequence of bits that indicates or is associated with the number of PUCCH transmissions (or PUCCH repetitions) that include HARQ feedback for a random access message, e.g., for message 4 of a random access procedure. Also, a second set of bits 514 may be scrambled based on a TC-RNTI assigned to the UE. In this manner, the scrambling of bits (or sets or subsets of bits) of the DCI CRC may be used to (e.g., implicitly) signal or indicate the number of PUCCH transmissions for the message 4 HARQ feedback, and/or the indicate the TC-RNTI for which this DCI is addressed. Thus, for example the first set of bits (e.g., 512, FIG. 5) of the cyclic redundancy check may be scrambled based on the sequence of bits that indicates or is associated with the number of physical uplink control channel (PUCCH) transmissions within the random access procedure. And, a second set of bits (514, FIG. 5) of the cyclic redundancy check may be scrambled based on a temporary cell-radio network temporary identifier (TC-RNTI) assigned to the UE, wherein the second set of bits 514 may be different than the first set of bits 512.

In addition, and/or in the alternative, one or more TCI-RNTI(s) may be assigned to the UE may be used to indicate the number of PUCCH transmissions. For example, there may be a mapping between one or more TC-RNTIs and one or more numbers of transmissions of the physical uplink control channel. For example, the following TC-RNTI values may be assigned to the UE, and a different number of PUCCH transmissions may be associated with each:

TC-RNTI 1→1 PUCCH transmission;

TC-RNTI 2 (offset of 1 from TC-RNTI 1)→2 PUCCH transmissions; and

TC-RNTI 3 (offset of 2 from TC-RNTI 2)→3 PUCCH transmissions.

The number of PUCCH transmissions the UE should perform may be determined by which of the TCI-RNTIs is used to scramble the DCI CRC. For example, if the UE descrambles the DCI CRC and detects TC-RNTI 3, then the UE knows this DCI is addressed to it, and the UE also knows or determines that the number of PUCCH transmissions the UE should perform is 3, e.g., based on the offset of 2 from the TC-RNTI 1 value.

Therefore, for example, the UE may determine the number of transmissions of the physical uplink control channel based on a TC-RNTI values assigned to the UE via a message 2 of the random access procedure. The UE may have multiple TC-RNTI values assigned to it via message 2, and each of these TC-RNTI values may indicate or be associated with a different number of PUCCH transmissions for message 4 HARQ feedback.

Alternatively, a base TC-RNTI value may also be assigned to the UE, e.g., TC-RNTI 0, where the number of PUCCH transmissions may be determined based on the offset of the TC-RNTI value that is used to scramble the DCI CRC. For example, a base value of TC-RNTI 0 is assigned, as well as other TC-RNTI values having offsets of 1, 2 and 3 (e.g., TC-RNTI 1, TC-RNTI 2, and TC-RNTI 3). Thus, if the UE descrambles the received DCI CRC and detects the TC-RNTI 2 that is assigned to the UE, this indicates that two PUCCH transmissions should be performed (based on the offset of M=2, from the base TC-RNTI value (TC-RNTI 0).

The example(s) above are examples of a mapping between one or more TC-RNTIs and one or more numbers of PUCCH transmissions, wherein a first TC-RNTI (e.g., TC-RNTI 3) assigned to the UE that is an offset of M (e.g., M=3) from a second temporary cell-radio network temporary identifier (TC-RNTI 0) indicates a number of M (e.g., M=3) transmissions of the physical uplink control channel.

Thus, according to example embodiment(s), one or more of the following features may be provided, for example:

An indication (e.g., an implicit indication, via scrambling of CRC bits) of the number of PUCCH repetitions for the HARQ ACK of the message 4 via specific scrambling of the scheduling DCI (the DCI that schedules or provides UL grant for message 4 of the random access procedure). In one embodiment, the implicit indication is based on a scrambling of one or more bits of the CRC of the DCI with a sequence of bits carrying additional information on the number of PUCCH repetitions. The sequence of bits could either carry the full information on the number of PUCCH repetitions (first implementation) or could be a codepoint or reference number (second implementation) to a higher layer configured table (e.g., where the lookup table may be communicated or identifies to UE via System Information Block 1 (SIB1)) that configures a set of number of PUCCH transmissions for different values of the sequence of bits. In the first implementation, a number of bits equal to $\lceil \log_2 N \rceil$ is necessary, where N is the maximum number of PUCCH repetitions, is necessary, to convey the information. For example, for a maximum of 8 PUCCH repetitions, 3 bits are necessary. In the second implementation (codepoint, or address that may be a table lookup value), a number of bits equal to $\lceil \log_2 K \rceil$ is necessary, where K is the number of entries in the table. For example for a table configuring K=4 values of repetitions (e.g. {1, 2, 4, 8}), $\log_2 4=2$ bits are necessary.

To avoid an excessive increase of the probability of false positive, for example, the CRC bits scrambled with the sequence of bits or information indicating (or associated with) the number of PUCCH repetitions are (or may be) the bits that are not already scrambled by the TC-RNTI (since such an approach would effectively reduce the number of available TC-RNTIs). See FIG. 5 as an example of a CRC with, e.g., a first set of bits 512 of CRC scrambled based on sequence of bits or information indicating or associated with the number of PUCCH transmissions, and a second set of CRC bits 514 that are scrambled based on TC-RNTI.

In one embodiment, the number of bits and which bits of the CRC that will be scrambled with information on the number of PUCCH transmissions may be predetermined or known in advance by UE and gNB, e.g., this information may be predetermined by specifications. In another embodiment, the number of bits and which bits of the CRC will be scrambled with information on the number of PUCCH transmissions is higher layer signalled in a previous message of the RACH (random access) procedure (e.g., this information may be broadcast by gNB via SIB, or transmitted to UE within the random access procedure via Msg2 RAR, or other message or transmission). In yet another embodiment, the "location" of the configured bits for the indication of number of PUCCH transmissions is configured in a dynamic manner by the gNB or network node (for instance in the example in FIG. 5, the offset (or "location") would be "0" (since bits 0 and 1 are scrambled based on information on number of PUCCH transmissions), but offsets could be configured by the gNB).

In another embodiment, the (e.g., implicit) indication of the number of PUCCH transmissions the UE should perform may be based on a scrambling of the CRC of the DCI with different versions (or different values) of the assigned TC-RNTI(s), each version associated to a number of PUCCH repetitions of the HARQ-ACK of the Msg4. In one embodiment, the mapping between TC-RNTI values and number of PUCCH repetitions is higher layer configured (e.g., configured by gNB by transmission of system information or SIB s). In another embodiment, the mapping between TC-RNTI values and number of PUCCH transmissions or repetitions may be implicit and is based on the assigned TC-RNTI values in the Msg2. For example, an offset of M from the assigned value of the TC-RNTI indicates a number of M PUCCH transmissions or repetitions.

Since, for example, the scrambling occurs on the CRC of the DCI before encoding (at transmitter) and after decoding (at receiver), only one decoding process is still necessary at the UE receiver, to retrieve the sequence of bits carrying the information on the number of PUCCH transmissions or repetitions. The number of evaluations of the received DCI may, in some cases, slightly increase, as the UE would evaluate the CRC demasking/descrambling under different hypothesis tests, but that would simply be a matter to see if the syndrome from the polynomial division (that constitutes the CRC algorithm) yields a bit sequence where the lower 16 bits match the expected TC-RNTI, while the two MSB (if so configured) match one of the available options for indication. The remaining (non-configured) bits may need to have a value "0" for the CRC to be evaluated as error-free, for example.

FIG. 6 is a diagram illustrating operation of a network according to an example embodiment. A UE 612 may be in communication with a gNB 610. The diagram of FIG. 6 includes steps 1-7.

Step 1: Network configures a Table with values of PUCCH transmissions (repetitions) for the HARQ ACK of the Msg4 via higher layer signalling (e.g., SIB1). In one example, the table may include values {1, 2, 4, 8} in rows {1, 2, 3, 4} respectively. Thus, a sequence of bits (that is used to scramble the bits of the DCI CRC) having a decimal value of 3 would indicate, from the table, that the UE should perform 4 PUCCH transmissions for the Msg4 HARQ feedback. Likewise, a sequence of bits having a decimal value of 4 would indicate, from the table, that the UE should perform 8 PUCCH transmissions for the Msg4 HARQ feedback.

Step 2: the gNB scrambles a first set of DCI CRC bits based on the sequence of bits indicating or associated with the number of PUCCH transmissions, and scrambles a second set of the DCI CRC bits based on the TC-RNTI assigned to the UE. The DCI (which includes scheduling information or DL grant for Msg4) is transmitted, including scrambled CRC.

UE proceeds with the RA (random access) procedure (Msg1, Msg2 and Msg3) and monitors the downlink control information or DCI (e.g., DCI 1_0, which is one type of DCI) (in response to the Msg3) that has a CRC that is scrambled with both the assigned TC-RNTI value and a sequence of bits indicating the number of PUCCH transmissions for the Msg4 HARQ feedback.

In this example, the configured table in step 1 has 4 entries and hence a sequence of 2 bits is necessary for indicating the number of repetitions (to uniquely identify one of the four table entries). For example, bit sequences {00, 01, 10, 11} of information bits are mapped to {1, 2, 4, 8} repetitions, respectively. In this example, the bits to scramble in the CRC of the DCI are predetermined and are the two Most Significant Bits (MSB) (e.g., see two bits at the top of CRC shown in FIG. 5) of the CRC as shown in example of FIG. 5. In this example, gNB indicates a number of 4 PUCCH repetitions by using a scrambling sequence, or sequence of bits, (that were used to scramble these bits of DCI CRC) of {10}.

Step 3: UE decodes the codeword of the DCI scrambled with its own TC-RNTI and de-scrambles the CRC with all possible bit sequences {00, 01, 10, 11} (e.g., all possible values of the bit sequences indicating or associated with the number of PUCCH transmission for Msg4 HARQ feedback). UE is able to reconstruct the bit sequence since it knows the configured table (UE knows all the possible values of the sequence of bits).

Step 4: UE descrambles CRC. UE checks which CRC checks out of all the de-scrambled CRCs, and chooses the corresponding bit sequence to retrieve information (based on the table) on the number of PUCCH transmissions for HARQ feedback of Msg4 of the random access procedure. In this example, UE notices that the CRC de-scrambled with bit sequence {10} is the one checking out or validates, and hence this informs UE that gNB indicated a number of 4 PUCCH transmissions or repetitions.

Step 5: UE chooses or determines the sequence of bits for which CRC was validated or checks out.

Step 6: UE performs a lookup into the table to determine the number of PUCCH transmissions for HARQ feedback for Msg4.

Step 7: UE transmits (or performs a transmission of) the PUCCH with HARQ ACK feedback for Msg4, the determined number (e.g., K) of times. In this example, K=4.

Some further examples will be provided.

Example 1. A method comprising: receiving, by a user device from a network node, a message including a first set of bits of a cyclic redundancy check that is scrambled based on a sequence of bits, wherein the sequence of bits indicates or is associated with a number of physical uplink control channel (PUCCH) transmissions within a random access procedure; descrambling, by the user device, the cyclic redundancy check to obtain the sequence of bits; determining, by the user device based on the sequence of bits, the number of physical uplink control channel transmissions within the random access procedure; and performing, by the user device within the random access procedure, a transmission of a physical uplink control channel the determined number of times.

Example 2. The method of Example 1, wherein the receiving comprises: receiving, by the user device from the network node, the message including downlink control information (DCI), the downlink control information including at least the first set of bits of the cyclic redundancy check that is scrambled based on the sequence of bits, wherein the sequence of bits indicates or is associated with the number of physical uplink control channel (PUCCH) transmissions within the random access procedure.

Example 3. The method of Example 2, wherein the downlink control information (DCI) includes a downlink grant or scheduling information for a message 4 of the random access procedure.

Example 4. The method of any of Examples 1-3, comprising: determining, by the user device, a mapping of different values of the sequence of bits to different numbers of physical uplink control channel (PUCCH) transmissions within the random access procedure.

Example 5. The method of any of Examples 1-4, wherein the determining the number of physical uplink control channel transmissions is based on a mapping of the sequence of bits to a number of physical uplink control channel (PUCCH) transmissions within a random access procedure.

Example 6. The method of any of Examples 1-5, wherein the determining the number of PUCCH transmissions is based on at least one of the following: determining a decimal representation of the sequence of bits, wherein the decimal representation of the sequence of bits indicates the number of physical uplink control channel (PUCCH) transmissions within the random access procedure; or performing a lookup into a table of numbers of physical uplink control channel (PUCCH) transmission based on the sequence of bits to obtain the number of physical uplink control channel transmissions.

Example 7. The method of any of Examples 1-6, wherein the performing comprises: performing, by the user device within a random access procedure, the transmission of the physical uplink control channel including hybrid automatic repeat request (HARQ) feedback for a message 4 of the random access procedure, the determined number of times.

Example 8. The method of Example 4 wherein the determining the mapping of different values of the sequence of bits to different number of the physical uplink control channel (PUCCH) transmissions comprises performing at least one of the following: determining, by the user device as a known or a predetermined mapping, the mapping of different values of the sequence of bits to different number of the physical uplink control channel (PUCCH) transmissions; or determining, by the user device based on a transmission or indication by the network node, the mapping of different values of the sequence of bits to different number of the physical uplink control channel (PUCCH) transmissions.

Example 9. The method of Example 8, wherein the transmission or indication by the network node is included in either a system information block or in a message of the random access procedure.

Example 10. The method of any of Examples 1-9, wherein: the first set of bits of the cyclic redundancy check is scrambled based on the sequence of bits that indicates or is associated with the number of physical uplink control channel transmissions within the random access procedure; and a second set of bits of the cyclic redundancy check is scrambled based on a temporary cell-radio network temporary identifier (TC-RNTI) assigned to the user device, wherein the second set of bits is different than the first set of bits.

Example 11. The method of any of Examples 1-10, wherein a location and/or a number of bits of the first set of bits of the cyclic redundancy check that is scrambled based on the sequence of bits, is determined based on at least one of the following: the location and/or number of bits of the first set of bits of the cyclic redundancy check is known or determined by the user device, and/or is based on a standard or specification; the location and/or number of bits of the first set of bits of the cyclic redundancy check is determined by the user device based on system information broadcast by the network node; or the location and/or number of bits of the first set of bits of the cyclic redundancy check is determined by the user device based on information previously received by the user device from the network node as part of the random access procedure.

Example 12. The method of any of Examples 1-8, wherein there is a mapping between one or more temporary cell-radio network temporary identifiers (TC-RNTIs) and one or more numbers of transmissions of the physical uplink control channel.

Example 13. The method of Example 12, further comprising: determining, by the user device, the number of transmissions of the physical uplink control channel based on a temporary cell-radio network temporary identifiers (TC-RNTI) assigned to the user device via a message 2 of the random access procedure.

Example 14. The method of any of Examples 1-13, wherein there is a mapping between one or more temporary cell-radio network temporary identifiers (TC-RNTIs) and one or more numbers of transmissions of the physical uplink control channel, wherein a first temporary cell-radio network temporary identifier (TC-RNTI) assigned to the user device that is an offset of M from a second temporary cell-radio network temporary identifier (TC-RNTI) indicates a number of M transmissions of the physical uplink control channel.

Example 15. An apparatus comprising means for performing the method of any of Examples 1-14.

Example 16. A non-transitory computer-readable storage medium comprising instructions stored thereon that, when executed by at least one processor, are configured to cause a computing system to perform the method of any of Examples 1-14.

Example 17. An apparatus comprising: at least one processor; and at least one memory including computer program code; the at least one memory and the computer program code configured to, with the at least one processor, cause the apparatus at least to perform the method of any of Examples 1-14.

Example 18. An apparatus comprising: at least one processor; and at least one memory including computer program code; the at least one memory and the computer program code configured to, with the at least one processor, cause the apparatus at least to: receive, by a user device from a network node, a message including a first set of bits of a cyclic redundancy check that is scrambled based on a sequence of bits, wherein the sequence of bits indicates or is associated with a number of physical uplink control channel (PUCCH) transmissions within a random access procedure; descramble, by the user device, the cyclic redundancy check to obtain the sequence of bits; determine, by the user device based on the sequence of bits, the number of physical uplink control channel transmissions within the random access procedure; and perform, by the user device within the random access procedure, a transmission of a physical uplink control channel the determined number of times.

Example 19. A method comprising: transmitting, by a network node to a user device, a message including a first set of bits of a cyclic redundancy check that is scrambled based on a sequence of bits, wherein the sequence of bits indicates or is associated with a number of physical uplink control channel (PUCCH) transmissions within a random access procedure; and receiving, by the network node from the user device within the random access procedure, a transmission of a physical uplink control channel the determined number of times.

Example 20. The method of Example 19, wherein the transmitting comprises: transmitting, by the network node to the user device, the message including downlink control information (DCI), the downlink control information including at least the first set of bits of the cyclic redundancy check that is scrambled based on the sequence of bits, wherein the sequence of bits indicates or is associated with the number of physical uplink control channel (PUCCH) transmissions within the random access procedure.

Example 21. The method of Example 20, wherein the downlink control information (DCI) includes a downlink grant or scheduling information for a message 4 of the random access procedure.

Example 22. The method of any of Examples 19-21, wherein the receiving comprises: receiving, by the network node from the user device within a random access procedure, the physical uplink control channel including hybrid automatic repeat request (HARD) feedback for a message 4 of the random access procedure, the determined number of times.

Example 23. The method of any of Examples 19-22, further comprising: transmitting an indication of a mapping of different values of the sequence of bits to different number of the physical uplink control channel (PUCCH) transmissions.

Example 24. The method of Example 23, wherein the indication transmitted by the network node is included in either a system information block or in a message of the random access procedure.

Example 25. The method of any of Examples 19-24, wherein: the first set of bits of the cyclic redundancy check is scrambled based on the sequence of bits that indicates or is associated with the number of physical uplink control channel transmissions within the random access procedure; and a second set of bits of the cyclic redundancy check is scrambled based on a temporary cell-radio network temporary identifier (TC-RNTI) assigned to the user device, wherein the second set of bits is different than the first set of bits.

Example 26. The method of any of Examples 19-25, wherein there is a mapping between one or more temporary cell-radio network temporary identifiers (TC-RNTIs) and one or more numbers of transmissions of the physical uplink control channel.

Example 27. The method of any of Examples 19-26, wherein there is a mapping between one or more temporary cell-radio network temporary identifiers (TC-RNTIs) and one or more numbers of transmissions of the physical uplink control channel, wherein a first temporary cell-radio network temporary identifier (TC-RNTI) assigned to the user device that is an offset of M from a second temporary cell-radio network temporary identifier (TC-RNTI) indicates a number of M transmissions of the physical uplink control channel.

Example 28. An apparatus comprising means for performing the method of any of Examples 19-27.

Example 29. A non-transitory computer-readable storage medium comprising instructions stored thereon that, when executed by at least one processor, are configured to cause a computing system to perform the method of any of Examples 19-27.

Example 30. An apparatus comprising: at least one processor; and at least one memory including computer program code; the at least one memory and the computer program code configured to, with the at least one processor, cause the apparatus at least to perform the method of any of Examples 19-27.

Figure 7:
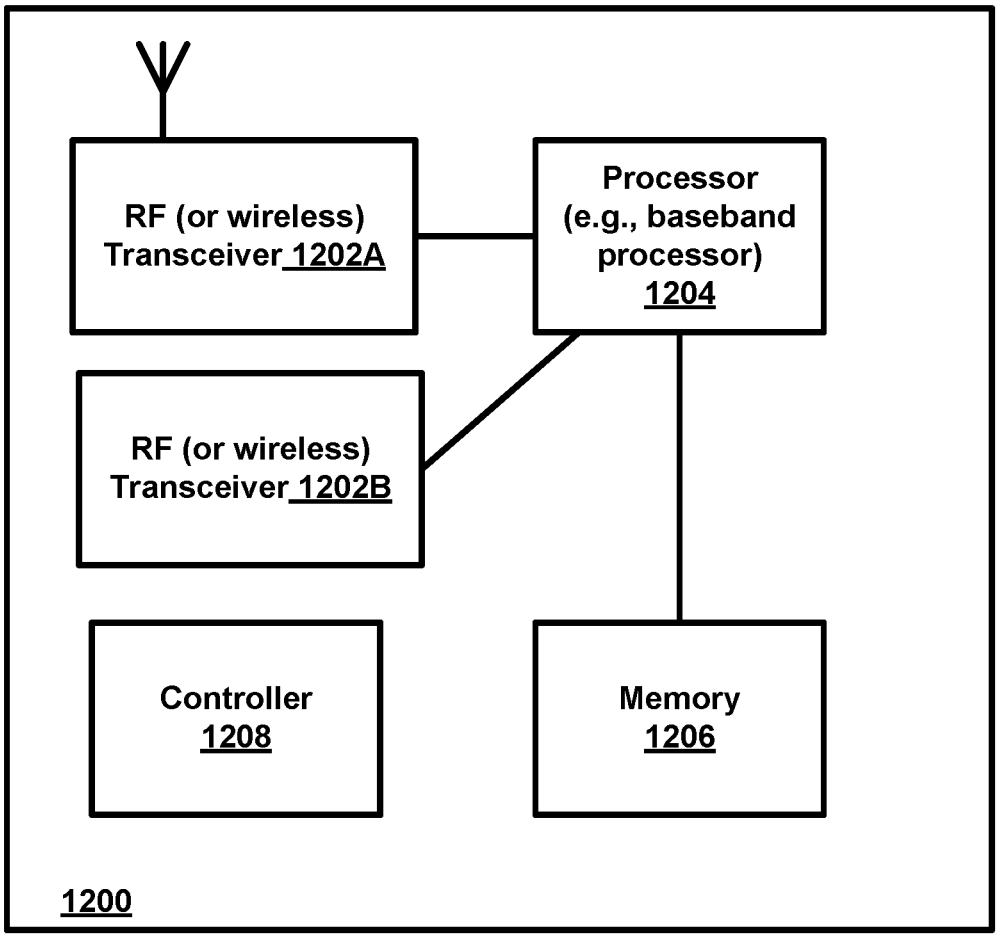
FIG. 7 is a block diagram of a wireless station or node (e.g., network node, user node or UE, relay node, or other node).

FIG. 7 is a block diagram of a wireless station or node (e.g., UE, user device, AP, BS, eNB, gNB, RAN node, network node, TRP, or other node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . .

) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a user device from a network node, a message including a first set of bits of a cyclic redundancy check that is scrambled based on a sequence of bits, wherein the sequence of bits indicates or is associated with a number of physical uplink control channel, PUCCH, transmissions within a random access procedure;
   descrambling, by the user device, the cyclic redundancy check to obtain the sequence of bits;
   determining, by the user device based on the sequence of bits, the number of physical uplink control channel transmissions within the random access procedure; and
   performing, by the user device within the random access procedure, a transmission of a physical uplink control channel the determined number of times,
   wherein the first set of bits of the cyclic redundancy check is scrambled based on the sequence of bits that indicates or is associated with the number of physical uplink control channel transmissions within the random access procedure, and
   wherein a second set of bits of the cyclic redundancy check is scrambled based on a temporary cell-radio network temporary identifier, TC-RNTI, assigned to the user device, wherein the second set of bits is different than the first set of bits.

2. The method of claim 1, wherein the receiving comprises:
   receiving, by the user device from the network node, the message including downlink control information, DCI, the downlink control information including at least the first set of bits of the cyclic redundancy check that is scrambled based on the sequence of bits, wherein the sequence of bits indicates or is associated with the number of physical uplink control channel, PUCCH, transmissions within the random access procedure.

3. The method of claim 2, wherein the downlink control information, DCI, includes a downlink grant or scheduling information for a message 4 of the random access procedure.

4. The method of claim 1, comprising:
   determining, by the user device, a mapping of different values of the sequence of bits to different numbers of physical uplink control channel, PUCCH, transmissions within the random access procedure.

5. The method of claim 1, wherein the determining the number of physical uplink control channel transmissions is based on a mapping of the sequence of bits to a number of physical uplink control channel, PUCCH, transmissions within a random access procedure.

6. The method of claim 1, wherein the determining the number of PUCCH transmissions is based on at least one of the following:

determining a decimal representation of the sequence of bits, wherein the decimal representation of the sequence of bits indicates the number of physical uplink control channel, PUCCH, transmissions within the random access procedure; or performing a lookup into a table of numbers of physical uplink control channel, PUCCH, transmission based on the sequence of bits to obtain the number of physical uplink control channel transmissions.

7. The method claim 1, wherein the performing comprises:
   performing, by the user device within the random access procedure, the transmission of the physical uplink control channel including hybrid automatic repeat request, HARQ, feedback for a message 4 of the random access procedure, the determined number of times.

8. The method of claim 4 wherein the determining the mapping of different values of the sequence of bits to different number of the physical uplink control channel, PUCCH, transmissions comprises performing at least one of the following:
   determining, by the user device as a known or a predetermined mapping, the mapping of different values of the sequence of bits to different number of the physical uplink control channel, PUCCH, transmissions; or
   determining, by the user device based on a transmission or indication by the network node, the mapping of different values of the sequence of bits to different number of the physical uplink control channel, PUCCH, transmissions.

9. The method of claim 8, wherein the transmission or indication by the network node is included in either a system information block or in the message of the random access procedure.

10. The method of claim 1, wherein a location and/or a number of bits of the first set of bits of the cyclic redundancy check that is scrambled based on the sequence of bits, is determined based on at least one of the following:
   the location and/or number of bits of the first set of bits of the cyclic redundancy check is known or determined by the user device, and/or is based on a standard or specification;
   the location and/or number of bits of the first set of bits of the cyclic redundancy check is determined by the user device based on system information broadcast by the network node; or
   the location and/or number of bits of the first set of bits of the cyclic redundancy check is determined by the user device based on information previously received by the user device from the network node as part of the random access procedure.

11. The method of claim 1, wherein there is a mapping between one or more temporary cell-radio network temporary identifiers, TC-RNTIs, and one or more numbers of transmissions of the physical uplink control channel.

12. The method of claim 11, further comprising:
   determining, by the user device, the number of transmissions of the physical uplink control channel based on a temporary cell-radio network temporary identifiers, TC-RNTI, assigned to the user device via a message 2 of the random access procedure.

* * * * *